United States Patent [19]

Revells et al.

[11] Patent Number: 4,571,253
[45] Date of Patent: Feb. 18, 1986

[54] PRESS BENDING APPARATUS

[75] Inventors: Robert G. Revells; Allan T. Enk, both of Toledo, Ohio

[73] Assignee: Libbey-Owens-Ford Company, Toledo, Ohio

[21] Appl. No.: 634,424

[22] Filed: Jul. 26, 1984

[51] Int. Cl.⁴ .............................................. C03B 23/03
[52] U.S. Cl. ....................................... 65/273; 65/287; 65/290
[58] Field of Search ........................... 65/273, 287, 290

[56] References Cited

U.S. PATENT DOCUMENTS 3,294,516 12/1966 Carson et al. ...................... 65/287 X
3,615,338 10/1971 Boyles ................................ 65/290 X
4,274,858 6/1981 Claassen et al. ................... 65/290 X Primary Examiner—Arthur Kellogg
Attorney, Agent, or Firm—Phillip S. Oberlin

[57] ABSTRACT

A lift assembly for a glass press bending apparatus of the type having upper and lower press bending members and including a reciprocally movable frame, a plurality of rotatable screwjacks operatively connected to the frame for moving the frame and a fluid actuator mounted on the movable frame by a trunnion mechanism and operatively connected to one of the press members by a self-aligning trunnion. A gear-drive mechanism operatively connected to the screwjacks rotate the screwjacks in unison.

6 Claims, 5 Drawing Figures

PRESS BENDING APPARATUS

BACKGROUND OF THE INVENTION

This invention relates generally to the glass bending art and, more particularly, to press bending apparatus incorporating a novel vertically adjustable mechanism for positioning a lower female press member with respect to an upper male press member.

Curved glass sheets have become increasingly popular for use as glazing enclosures for automobiles and the like. A number of different curvatures is encountered as the degree of curvature of the flat glass sheets is dictated by the configuration and size of the openings in the overall design of different styles of automotive vehicles.

In the manufacture of curved glass sheets in large quantities, one common method of producing curved, tempered sheets of glass is heating flat sheets of glass to their softening temperature, pressing the softened sheets to the desired curvature between complemental shaping surfaces and then rapidly chilling the bent sheets in a controlled manner to a temperature below the annealing range of the glass. Generally, these operations are carried out successively while the sheets of glass are being advanced substantially continuously on a conveyor system along a horizontal path including a heating area, a bending area, and a chilling or tempering area whereby the heat initially imparted to each sheet to bring it to the proper bending temperature can also be utilized in the final heat treating or tempering operation.

The above referred to complemental shaping surfaces are formed on opposed press members each mounted on a supporting platen. The press members and the respective platens are normally located one above and one below the horizontal path of movement of the glass sheets to receive the latter therebetween, and are movable relative towards and away from each other for pressing the sheets into the desired shape. Generally, a hydraulic actuator is employed for raising the lower platen and press member upwardly to engage and lift a heated glass sheet off the conveyor system out of such horizontal path and press the same against the shaping surface of the opposed or upper press member.

Conventionally, a variety of curved glazing enclosures are run over a common production line and the fluid actuator has been mounted on a stationary member and its length of stroke has been determined by the depth of curvature of the particular style of glazing enclosure being produced. Accordingly, each time a glazing enclosure having a substantially different depth of curvature is to be produced, it is necessary to replace the fluid actuator with one having a different length of stroke to accommodate the depth of curvature of the new glazing enclosure. Not only is this changing of the fluid actuator time consuming, but the repeated connecting and disconnecting of the fluid lines of the actuator results in premature wear and leakage and eventual replacement of the fluid actuator.

SUMMARY OF THE INVENTION

The present invention overcomes the aforementioned problems by mounting a fluid actuator on a vertically positionable platform whose position is controlled by a plurality of screwjacks commonly rotated in unison whereby the position of the fluid actuator is adjusted with respect to a number of different types of press members.

An object of the invention is to produce a reciprocating platform whose position is adjustable for utilizing a short stroke fluid actuator.

Another object of the invention is to produce a lift mechanism for use in a press bending apparatus which is quickly and easily positionable for accommodating press members of differing degrees of curvature.

Still another object of the invention is to produce a lift mechanism of the above character that is readily adjustable during continued operations.

BRIEF DESCRIPTION OF THE DRAWINGS

The above-mentioned and other features, objects and advantages, and a manner of obtaining them are described more specifically below by reference to an embodiment of the invention shown in the accompanying drawings; in which.

DESCRIPTION OF THE PREFERRED EMBODIMENT

Figure 1:
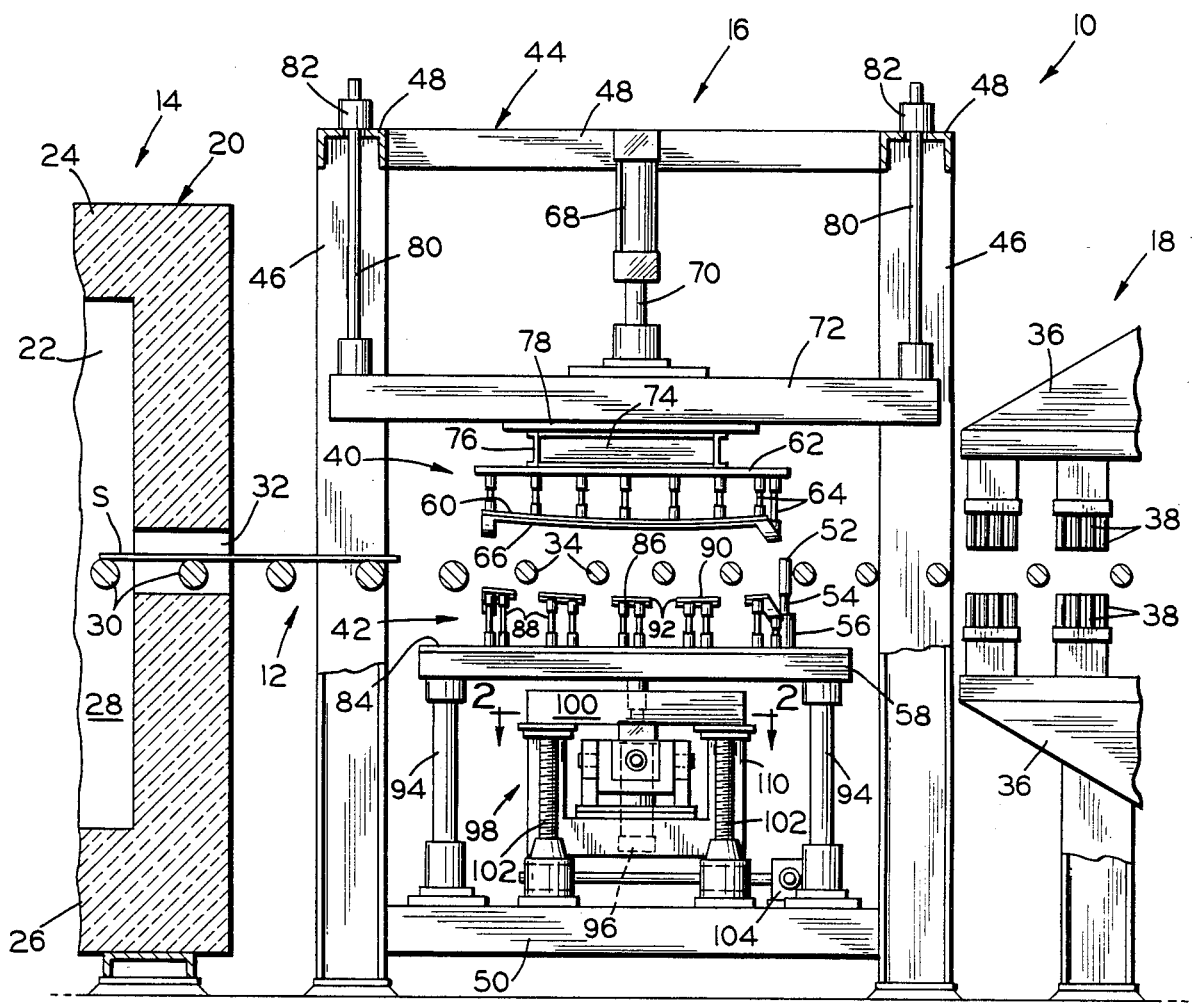
FIG. 1 is a side elevational view of a horizontal press bending apparatus embodying and diagrammatically illustrating the novel features of the present invention.
Figure 2:
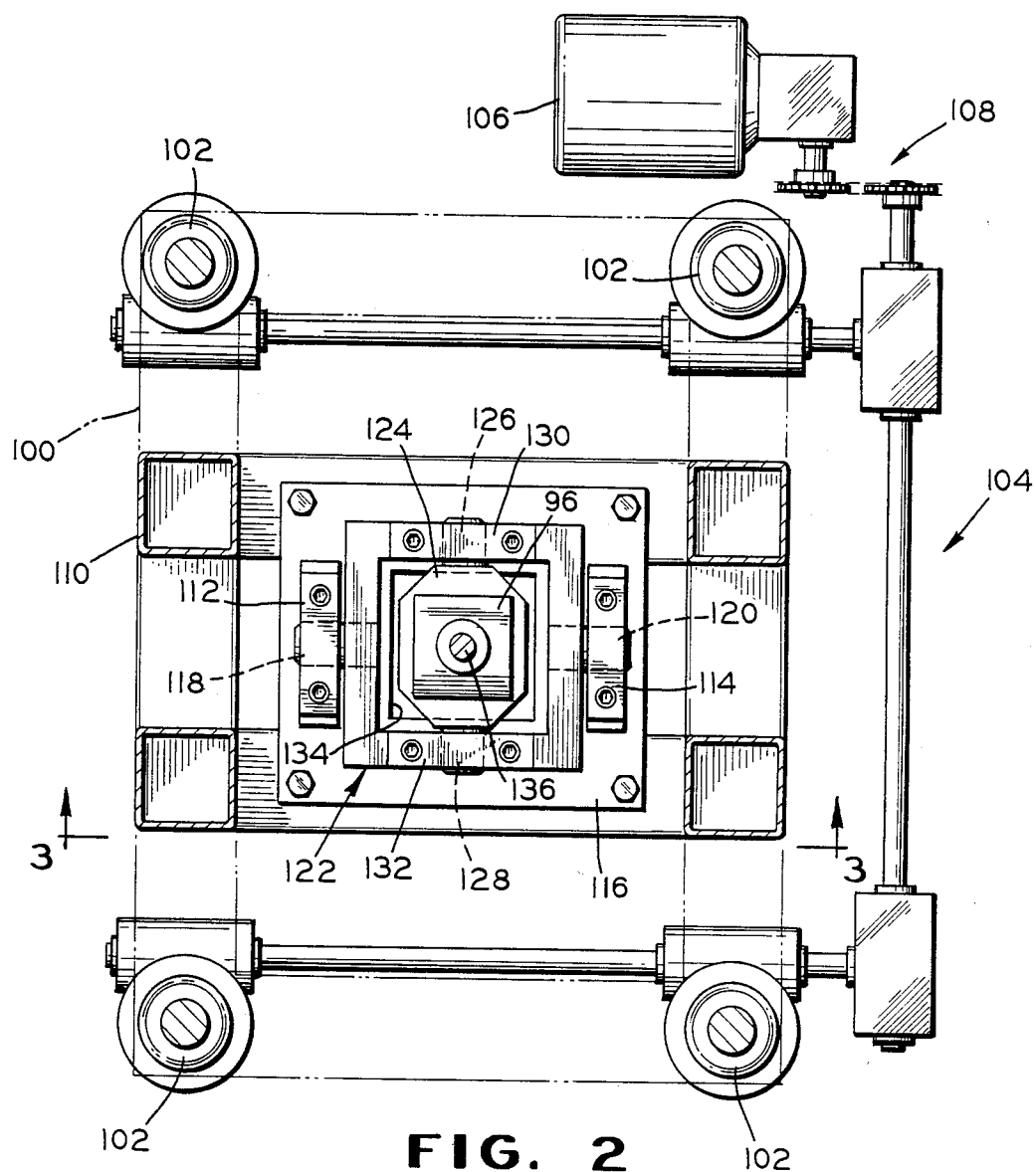
FIG. 2 is a partial cross-sectional view taken substantially along line 2—2 of FIG. 1.

Referring in detail to the embodiment illustrated in the accompanying drawings, there is shown in FIG. 1 a bending and tempering apparatus, designated in its entirety by the reference numeral 10, for producing bent tempered glass sheets by a continuous process in which the sheets are moved successively along a predetermined path through a heating area, a bending area, and a tempering area, these areas being contiguous so that a sheet passes immediately from one area to the next succeeding area. To this end, apparatus 10 includes a conveyor system 12 adapted to support a plurality of sheets S in a horizontal plane for movement, one by one, along a predetermined horizontal path through a heating section 14, a bending section 16, and a tempering section 18, the sections 14, 16, and 18 being disposed end-to-end along the predetermined path.

In the illustrated embodiment, the heating section 14 comprises a tunnel-type furnace 20 having a heating chamber 22 defined by a top wall 24, a bottom wall 26, and opposed side walls 28, all formed of a suitable refractory material. The chamber 22 can be heated in any desired manner by suitable heating means, such as gas fired burners or electrical resistance elements, for example (not shown), located in the top and side walls of the furnace 20. The sheets S are advanced through the heating chamber 22 on a series of conveyor rolls 30 which form a part of the conveyor system 12, and extend from the entrance end (not shown) of the furnace 20 to an oppositely disposed exit end. The sheets S are heated to substantially the softening point of the glass during their passage through the chamber 22 and, upon emerging from the opening 32 in the exit end of the furnace, are received on a second series of conveyor rolls 34, also a part of the conveyor system 12 which move the sheets into and within the bending chamber 16 between a pair of press members, hereinafter identified and more fully described, for imparting the desired curvature to the sheets S. Movement of the lower press member is controlled by a hydraulic fluid pressure system (not shown).

After bending, the sheet S is advanced along a path on conveyor rolls 34, which move the bent sheet S to and through tempering section 18 wherein its temperature is rapidly reduced to produce the proper temper in the glass. In the illustrative embodiment, the tempering section 18 includes cooling means comprising upper and lower blast heads 36 disposed above and below the path of movement of the glass sheets and are provided with a series of tubes 38 operable to direct opposed streams of cooling fluid, such as air or the like, toward and against the opposite surfaces of the sheets S moving along in such path.

The bending apparatus 10 generally comprises an upper male press member 40 and a lower female press member 42 having opposed complemental shaping surfaces conforming to the desired curvature of the sheet to be bent. The press members 40 and 42 are mounted for relative movement toward and away from each other on a structural frame 44, which includes a frame work of vertically disposed columns 46 and horizontally extending beams 48 interconnected and secured together to form a rigid, box-like structure. A base member 50 extends between the upright columns 46 for supporting the female press member 42 and associated parts. The male press member 40 is mounted above the conveyor rolls 34 for vertical reciprocal movement relative to the frame 44 while the female press member 42 is located below the conveyor roll 34 and mounted for vertical reciprocal movement toward and away from the male press member 40.

A pair of laterally spaced locator stops 52 (only one of which is shown in FIG. 1) is positioned in the path of movement of the advancing glass sheets to interrupt movement thereof and accurately position the same in the desired location relative to the press members 40 and 42. Each stop 52 is secured to the distal end of a piston rod 54 of a fluid actuating cylinder 56 mounted on a carriage or platen 58. The cylinders 56 are operative to raise and lower the stops 52 between an upper position above the conveyor rolls 34 in the path of movement of the glass sheet S and a lower position therebeneath.

The male press member 40 is of outline or ring-type construction and comprises a continuous shaping rail 60 connected to a base member 62 by a plurality of connecting rods 64. The shaping rail 60 conforms in outline to the glass sheets S to be bent and is provided with a downwardly directed, generally convex shaping surface 66 on the lower surface thereof to impart the desired curvature to the sheet. However, the particular outline of the shaping rail 60, as well as a specific curvature of the shaping surface 66, is dictated by the desired shape of the glass sheet being bent and can vary widely, as desired. Also, it should be understood, a press member of the solid or continuous shaping surface-type may be used if desired, without departing from the scope of the invention.

The means for supporting the male press member 40 on the frame 44 includes at least one actuating cylinder 68 mounted on one of the upper horizontal beams 48 and having a suitable reciprocal piston (not shown) provided with a piston rod 70 connected at its outer end to a vertically reciprocal platen frame 72. The base member 62 of the male press member 40 is connected to the platen frame 72 for movement therewith by means of interconnected structural members 74 and 76 and a support plate 78 extending transversely of the platen frame 72. A plurality of guide posts 80 are connected at their lower ends to the four corners of platen frame 72, respectively, and extend upwardly through suitable bushings 82 mounted on upper horizontal beam 48 for sliding movement relative thereto to properly guide platen frame 72 during its vertical reciprocal movement.

The female press member 42 also is of outline or ring-type construction and comprises a base member 84 secured to the platen 58 and a shaping rail 86 connected to the base member 84 in spaced relation thereto by way of a series of connecting rods 88. The shaping rail 86 conforms in outline to the glass sheets S to be bent and is provided on its upper face with a generally concave shaping surface 90 complementary to the male press member shaping surface 66 in opposed relation thereto. To permit displacement of the female shaping rail 86 above the level of the conveyor rolls 34 for lifting the glass sheets thereabove into pressing engagement with the male shaping surface 66, the female rail 86 is formed of a plurality of segments 92 spaced apart from each other a sufficient distance to pass between the adjacent rolls 34. As compared to rolls 30, the diameters of rolls 34 are formed relatively small to provide maximum clearance therebetween for the passage of the segments 92 therethrough.

Figure 5:
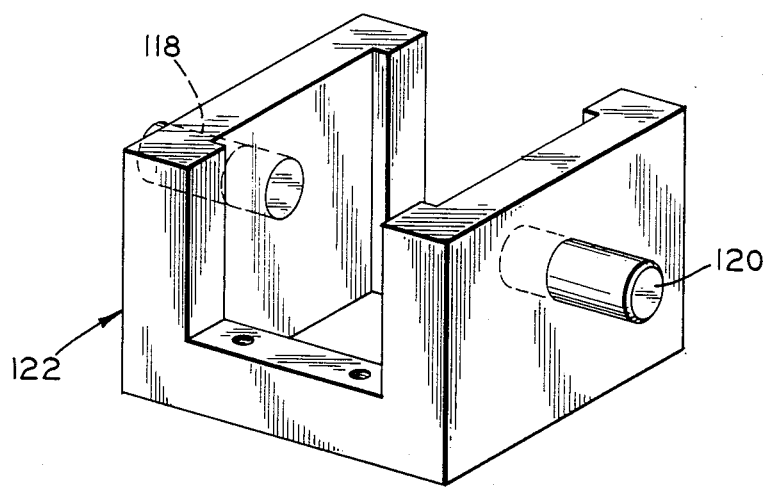
FIG. 5 is a perspective view illustrating the trunnion bracket of this invention.
Figure 3:
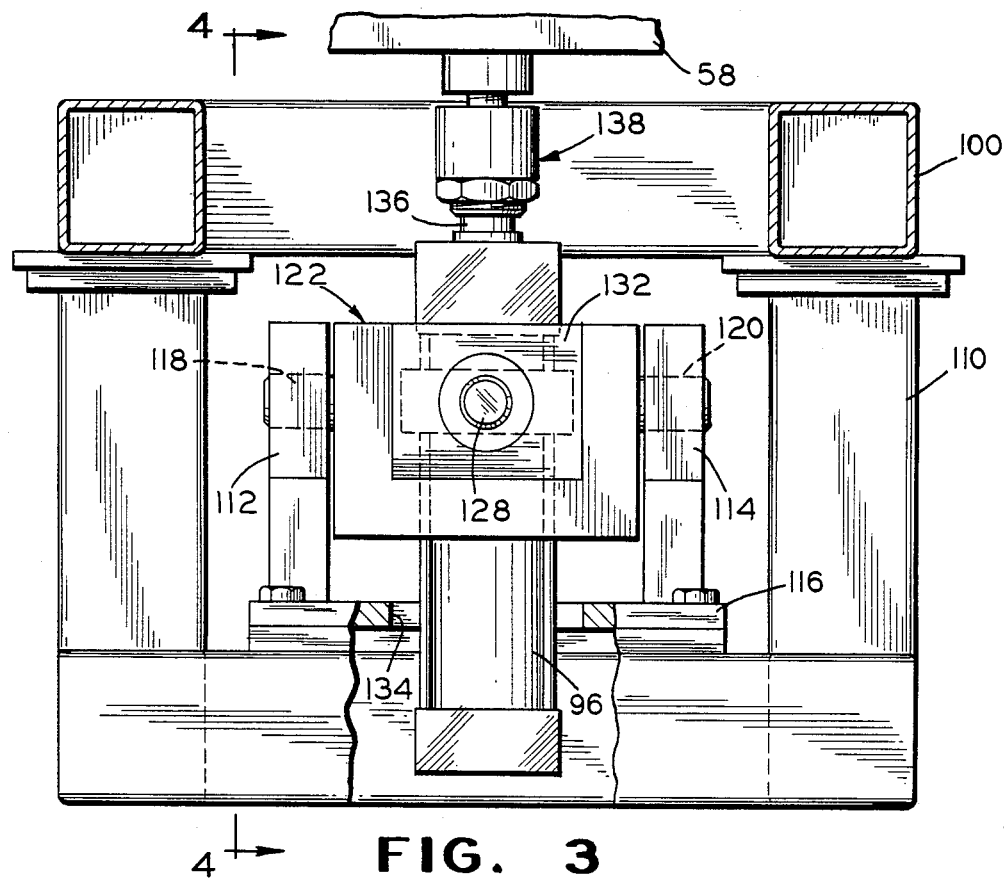
FIG. 3 is a partial cross-sectional view taken substantially along line 3—3 of FIG. 2.
Figure 4:
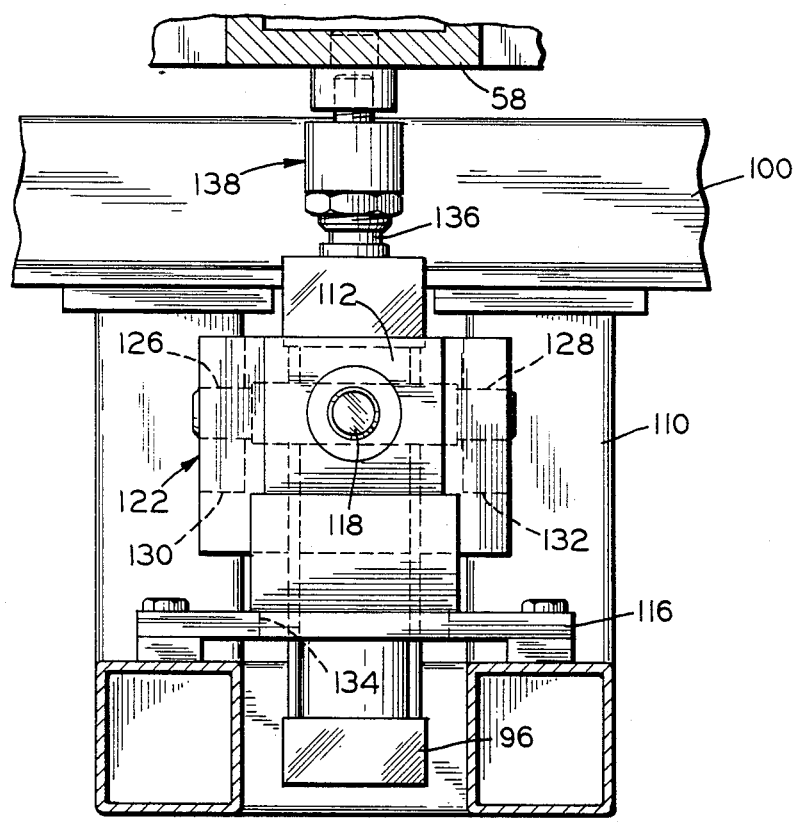
FIG. 4 is a partial cross-sectional view taken substantially along line 4—4 of FIG. 3.

In accordance with the invention, the platen 58 is supported by guide means 94 and is vertically moveable by a fluid actuator 96 mounted on a lift system designated in its entirety by the reference numeral 98. The lift system 98 comprises a vertically movable frame 100 supported at its four corners by screwjacks 102 whose lower ends are mounted on the base member 50. The screwjacks 102 are rotated in unison by a gear drive mechanism 104 driven by a motor 106 by way of a chain and sprocket mechanism 108. A cylinder cradle frame 110, depending from the underside of the frame 100, pivotally supports the fluid actuator 96 about horizontal axes so that the actuator 96 may align itself vertically with respect to the carriage 58. More particularly, the cylinder cradle frame 110 is provided with a pair of opposed bearing blocks 112 and 114 supported on a plate 116, which pivotally support trunnions 118 and 120, respectively, which in turn extend in diametrically opposed relations from a U-shaped trunnion bracket 122 (FIG. 5). Mutually perpendicular to trunnions 118 and 120 and located on an intermediate pivotal member in the form of a yoke 124, are a pair of axially aligned opposed trunnions 126 and 128 which are pivotally supported in bearing blocks 130 and 132, respectively, carried by trunnion bracket 122. The center portion of the plate 116 supporting the bearing blocks 112 and 114 is provided with a central opening 134 through which the fluid actuator 96 extends from movement relative thereto. The fluid actuator 96 includes a piston rod 136 attached at its upper end to carriage 58 by a self-aligning coupler 138. The coupler 138 together with the pivotal support assembly for actuator 96 described above, cooperate to compensate for misalignment between the carriage 58 and fluid actuator 96.

The actuator 96 is operative to raise and lower the female press member 42 between its lower position beneath the conveyor rolls 34 and its upper position thereabove for lifting a heated glass sheet S from the conveyor rolls 34 and pressing the same against a male press member 40 between the complementary shaping surfaces 66 and 90, thus forming the glass sheet to the desired curvature. After bending, piston rod 136 is restricted to lower the female press member 42 below the conveyor rolls 34 depositing the bent sheets thereon for advancement into the tempering section 18.

In a typical operational cycle, glass sheets S are loaded one at a time onto the conveyor rolls 30 at the entrance end (not shown) of the furnace 20 for movement through the heating chamber 22 wherein each sheet S is heated to substantially its softening point or bending temperature. The heated sheet S passes through the opening 32 and is transferred onto the conveyor rolls 34 for movement into the bending section 16. As the sheet enters the bending section 16, a photocell or other suitable detection device (not shown) initiates activation of a timer (not shown) controlling operation of the bending cycle. The timing of this control is such that the leading edge of the glass sheet S engages the stops 52, cylinder 96 is actuated to raise the female press member 42 upwardly to remove the sheet from the conveyor rolls 34, and press the same against the shaping surface 66 of the male press member 40. During the upstroke of the female press member 42, cylinders 56 are actuated to retract the locator stops 52 to permit advancement of the bent sheet when subsequently returned to the conveyor rolls 34.

After the glass sheet S has been shaped between the press members 40 and 42 to impart the desired curvature thereto, the female press member 42 is lowered, as by means of cylinder 96, below conveyor rolls 34 to deposit the bent sheet thereon for advancement out of the bending section 16 and into the tempering section 18. The bent sheet is advanced by conveyor rolls 34 into and through the tempering section 18 between the opposed tubes 38 of blast heads 36 at a speed promoting a proper rate of cooling to obtain the desired temper in the bent sheet.

It will be noted that the best suited operational position of the carriage or platen 58 and lower press member 42 is accomplished by raising or lowering the frame 100 by means of the screwjacks 102. Accordingly, a variety of lower press members having different degrees of curvature may be mounted on the carriage or platen 58 and suitably positioned relative to the conveyor rolls 34 and the upper press member for pressing engagement therewith by the fluid actuator 96. It should also be noted that adjustments can be made to the elevation of the lower press member when necessary during continued operation.

A particular advantage of the present invention is that the lower press member (generally the female), regardless of curvature, may be precisely positioned to enable the use of a fluid actuator with a relatively short stroke to minimize pressing cycle time and consequently, "draw" time. Draw time is the time that a given sheet leaves the heating furnace and is fully within the tempering area. Besides providing maximum production, keeping draw time to a minimum becomes essential when producing thin sheets, e.g., those ranging in thickness from 0.090 to 0.156 inch, because the rapid rate of heat loss in such thin sheets necessitates advancing the sheet into the tempering section as rapidly as possible to obtain proper temper.

From the foregoing, it is apparent that the objects of the present invention have been fully accomplished. As a result of this invention an improved lift system for positioning the press members is produced and also includes a novel aligning means for the fluid actuator. While the invention has been described in connection with a glass bending apparatus comprising a pair of complementary shaped press members, it should be appreciated that the lift assembly of the invention also has utility in inertia-gravity type glass bending molds or in any application where it is important to assure position of a lower carriage.

It is to be understood that the form of the invention herewith shown and described is to be taken as a preferred embodiment only of the same and that various changes in the shape, size, and arrangement of the parts may be resorted to without departing from the spirit of the invention.

We claim:

1. In a glass sheet bending apparatus of the type having a bending member and a fluid actuator including a piston operatively connected to the bending member, the improvement comprising a movable frame for supporting the bending member, means operatively connected to said movable frame for reciprocally moving said frame, said means comprising a plurality of screwjacks and mechanism for rotating said screwjacks in unison, and means for mounting the fluid actuator on said movable frame for movement therewith.

2. In a glass sheet bending apparatus of the type having upper and lower bending members and a fluid actuator including a piston operatively connected to the lower bending member, the improvement comprising a movable frame for supporting the lower bending member, means operatively connected to said movable frame for reciprocally moving said frame, said means comprising a plurality of screwjacks and mechanism for rotating said screwjacks in unison, trunnion means for mounting the fluid actuator on said movable frame for movement therewith, and self-aligning means for coupling the piston of said fluid actuator to said lower bending member.

3. An apparatus as defined in claim 1, wherein said means for mounting the fluid actuator on said movable frame comprises a trunnion mechanism.

4. An apparatus as defined in claim 1, including self-aligning means for coupling the piston of the fluid actuator to the bending member.

5. An apparatus as defined in claim 3, including self-aligning means for coupling the piston of the fluid actuator to the bending member.

6. An apparatus as defined in claim 3, wherein said trunnion mechanism comprises a first pair of axially aligned opposed trunnions and a second pair of axially aligned opposed trunnions mutually perpendicular to said first pair of trunnions.

* * * * *

UNITED STATES PATENT AND TRADEMARK OFFICE
CERTIFICATE OF CORRECTION

PATENT NO. : 4,571,253
DATED : February 18, 1986
INVENTOR(S) : Robert G. Revells and Allan T. Enk It is certified that error appears in the above-identified patent and that said Letters Patent are hereby corrected as shown below:

Col. 5, line 4, "restricted" should be --retracted--

Signed and Sealed this

Twentieth Day of May 1986

[SEAL]

Attest:

Attesting Officer

DONALD J. QUIGG

Commissioner of Patents and Trademarks